Nov. 16, 1926.
W. B. CHURCHER ET AL
1,607,512
LIQUID GAUGE
Filed June 18, 1923    2 Sheets-Sheet 2
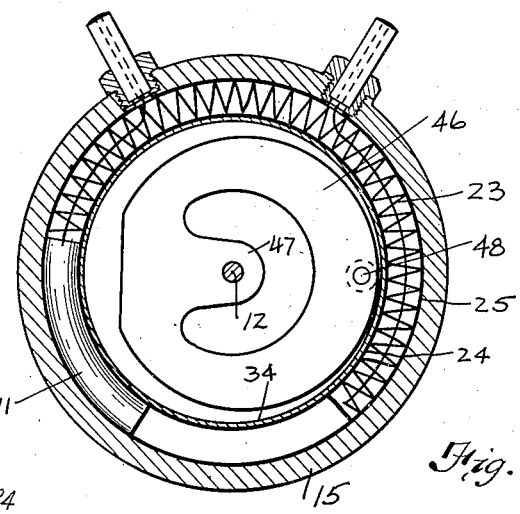
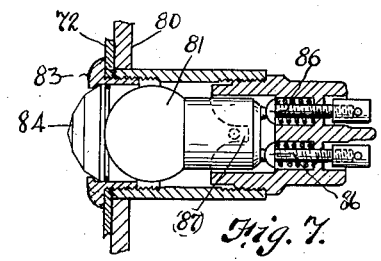
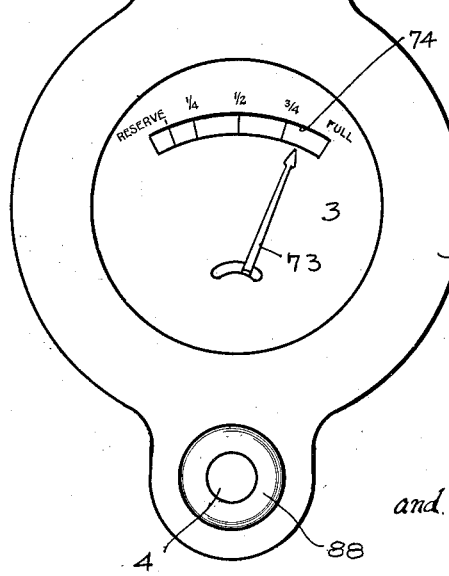
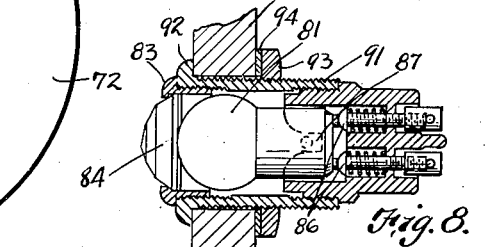
INVENTORS
William B. Churcher
and George S. Salzman
BY
Fay, Oberlin & Fay
ATTORNEYS Nov. 16, 1926.
W. B. CHURCHER ET AL
1,607,512
LIQUID GAUGE
Filed June 18, 1923    2 Sheets-Sheet 1
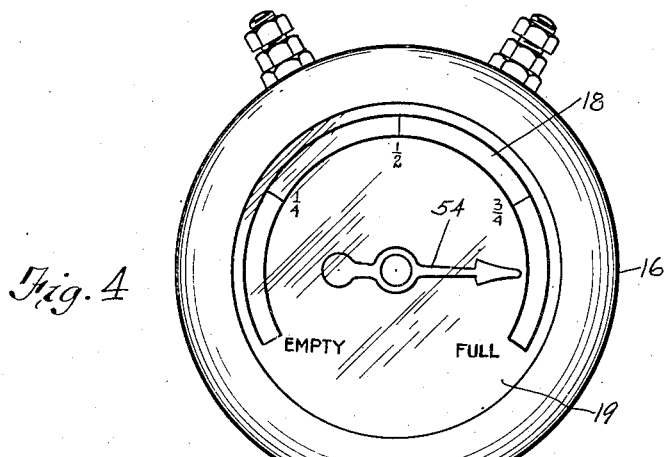
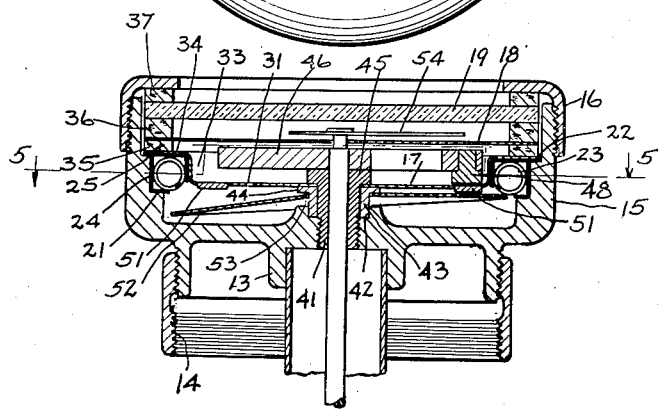
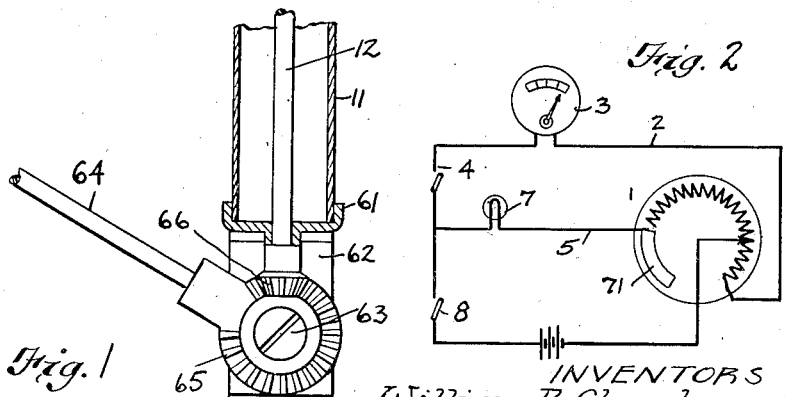
INVENTORS
William B. Churcher and
George S. Salzman
BY
Fay, Oberlin & Fay
ATTORNEYS Patented Nov. 16, 1926.

1,607,512

UNITED STATES PATENT OFFICE.

WILLIAM B. CHURCHER AND GEORGE S. SALZMAN, OF CLEVELAND HEIGHTS, OHIO.

LIQUID GAUGE.

Application filed June 18, 1923. Serial No. 646,010.

This invention relates to a liquid gauge. More particularly it comprises a liquid gauge giving at all times an indication at the tank or liquid container of the amount of liquid therein and also giving at any particular time, at a distant point, an indication of the exact quantity of liquid in the container, as well as giving a positive independent indication when the supply of liquid in the container has reached a predetermined point such as the approaching depletion of the supply in the case of gasoline tanks on automobiles.

In apparatus heretofore devised to give indications of the liquid supply in tanks at distant points, particularly by electrical means, it has been usual to have such indicator constantly operating. This entailed a heavy draft upon the current supply and as applied to motor vehicles this feature is one of considerable disadvantage, inasmuch as the apparatus not infrequently made too heavy a drain on the electrical system installed in the car. Furthermore, the construction of such apparatus in many instances included a fairly large number of parts, many of them requiring careful manufacture and assembly and the cost thereof was prohibitive for general use in motor vehicles.

The object of the present invention is to provide a device which will give momentary indications upon a dial when a circuit is closed and which will also give an independent indicating signal to show the approaching depletion of the reserve supply of fuel. Another object of the invention is to supply an apparatus of this character of light and simple construction, easy to assemble and involving no complicated machining or relatively costly parts. Further objects of the invention will appear in the course of the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a sectional elevation taken centrally of the mechanism applied to the liquid container, the float being omitted; Fig. 2 is a diagrammatic view showing the electrical circuits employed; Fig. 3 is a front elevation of the indicating apparatus applied to the instrument board of an automobile; Fig. 4 is a top plan view of the mechanism applied to the liquid container; Fig. 5 is a sectional plan view taken along the line 5—5 shown in Fig. 1, looking in the direction of the arrows; Fig. 6 is a front elevation of the reserve supply indicating light applied to the instrument board of an automobile; Fig. 7 is a longitudinal sectional view of the preferred form of construction as applied to the plate mounted on the instrument board; and Fig. 8 is a longitudinal sectional view showing a modified form of mounting the reserve supply indicating light upon the instrument board of an automobile or in any other suitable place where a flush type signal light is desired.

The device has been shown as applied to the gasoline tank of an automobile to give indications upon the instrument board thereof, as well as immediately adjacent said tank. While the instrument is peculiarly adapted for use on an automobile, the following description is not intended in any way to limit the application of the invention to other uses within the scope of the claims. Likewise, the signal lamp shown with the apparatus is capable of independent use wherever a flush type signal light may be desirable.

As is clearly shown in Fig. 2 of the drawing, the apparatus comprises the mechanism 1, actuated by the float in the liquid container to control the current in the circuit 2, which includes the indicating instrument 3. A push button switch 4 serves to maintain the circuit in open condition, except at such times as when an indication is desired. The apparatus also comprises a second circuit 5, which circuit has contact elements so located as to give a visual indication by means of a lamp 7 when the reserve supply of the gasoline tank has been reached, and the total quantity of fuel in the tank is approaching depletion. Each of the circuits 2 and 5 is connected with the ignition switch 8 of the automobile and when said ignition switch is turned to closed position, a reading may be had any time upon the closing of the circuit controlled by said push button, or through the bringing together of the contact elements in the lamp circuit which indicate the approaching depletion of the fuel supply.

A tubular housing 11 for an indicator shaft 12 is carried centrally of the under side of a cap member 13, adapted to be screwed into a collar 14 secured to the upper side of the usual gasoline tank (not shown) provided at the rear of the automobile. The collar 14 is provided with right and left handed threads on its opposite sides in order to permit the easy and secure attachment of the cap member to the gasoline tank. The cap member is provided on its upper side with an extension wall 15 screw-threaded about its upper edge to engage with a flanged ring 16. This ring when screwed down upon said cap, is adapted to hold in position the margins of a rheostat cover plate 17, a dial plate 18, and a glass cover plate 19. The extension wall 15 of the cap is provided on its inner face with two off-set portions or shoulders 21, 22. Against the first of these shoulders a rheostat coil 23 is adapted to be positioned. Said coil is held in place by means of a pair of annular insulating members 24, 25, having marginal portions thereof resting upon the shoulder 22. The rheostat cover plate 17 is provided with a depressed central portion 31 and is connected by means of a vertical wall 33 with its circumferential portion 34 which is seated above the annular insulating members 24, 25, of the rheostat coil. A gasket 35, preferably of cork, serves to space the flange 34 from the dial plate 18. A similar gasket 36 is placed above the dial plate and serves to space the glass cover plate 19 therefrom. Above the glass plate a suitable gasket 37 is positioned and the inwardly turned flange of the ring 16 bears against this last mentioned gasket and serves to compress the same and the interposed gaskets 35, 36, and hold the same under compression so as to hermetically seal the several chambers thus provided within the cap member. The vertical shaft 12 extends centrally through the cap member, being held in rotatable position therein by means of an iron bearing block 41 screw-threadedly engaged in the aperture centrally of the base of said cap member. About said aperture a countersunk section 42 is provided in the top face of said base member and within said countersunk portion a flanged iron collar 43 is seated. The flanged portion 44 of said collar bears against the under side of the contact cover plate 17, which is centrally apertured to fit about the bearing block 41. Said bearing block is provided at its upper edge with an extension flange 45 which rests upon the upper side of the contact cover plate and which supports on this upper side a permanent magnet 46.

This magnet, as is clearly shown in Fig. 5, is of substantially circular conformation but has a projecting tongue 47, by means of which it is secured to the shaft 12 immediately beneath the dial 18. The magnet is a permanent steel magnet and the projecting tongue may constitute the south pole thereof. The north pole of the magnet is then located directly opposite said projecting tongue and comprises a stud 48 projecting downwardly from the under surface of the body of the magnet, and closely adjacent the depressed portion 31 of the rheostat cover plate 17. At a plurality of points immediately beneath the path of said downwardly projecting stud of the magnet, the rheostat cover plate, which is of non-magnetic material, is provided with inserted iron buttons 51. These buttons have their upper surface flush with the upper surface of the contact cover plate, but their under surface projects downwardly from the under surface of said plate for a purpose to be hereinafter disclosed.

By reference to Fig. 1 it will be noted that the under surface of the rheostat coil lies in a slightly lower horizontal plane than the under surface of the steel buttons inserted in the contact cover plate and in substantially the same horizontal plane as the under surface of the flange 44.

In the space between the rheostat cover plate and the bottom of said cap, a thin circular steel disc 52, having a slightly convex formation in an upwardly direction, is provided with a central aperture 53 by means of which it is loosely mounted over the collar 43. The aperture in the disc is of sufficient size to permit the disc to be freely tilted about said collar but is of less diameter than the flanged portion 44 of the collar. The total diameter of the disc is sufficient to bring the circumferential edge of the disc to a point immediately beneath the central portion of the under side of the rheostat coil. This thin sheet metal disc thus constitutes an armature for the magnet and serves as a floating contact to tilt or roll across the several turns of the rheostat coil immediately adjacent the position of the north pole of the permanent magnet. As this pole is shifted the point of contact of the disc with the rheostat coil or with the plate 71, hereinafter described, will be varied in like degree. It should be noted that the thin metal disc, which constitutes a "floating" contact, has its central portion in constant contact with the flange of the iron collar 43 which is seated about the iron bearing block 41, and that the space between the armature and the inserted iron buttons of the rheostat cover plate is a very slight one and that the magnetic attraction at the north pole is thus increased because of the constant direct connection of said disc with the south pole of said magnet.

Inasmuch as the permanent magnet is rigidly secured upon the upper end of the shaft 12, said magnet, as well as the indicator hand 54 secured to said shaft immediately above the dial 18, will be turned whenever said shaft is rotated. The lower end of the shaft 12 is journaled centrally of the bottom cap 61 secured to the lower end of the tubular housing 11. The cap 61 carries a downwardly depending extension bracket 62 which serves to support a pin 63 upon which the float carrying arm 64 is pivotally mounted. A pair of beveled gears 65, 66, serve to transmit motion from the float carrying arm to the shaft as the position of the float (not shown) varies with the change in the level of the liquid in the receptacle.

As the shaft 12 is rotated it will carry the pointer 54 and the permanent magnet 46 through a certain range of motion. The pointer will traverse the several sections of the dial from the full to the empty position as the liquid contents of the tank are depleted. Intermediate markings show the one-fourth, one-half and three-fourths filled positions. The markings may be in any desired units. As the permanent magnet moves around, the free pole thereof will attract the light tiltable floating contact disc and draw the adjacent portion thereof to the position shown in Fig. 1. In this position the upper circumferential portion thereof will engage in rolling contact with the under side of the rheostat coil and as the free pole of the magnet is moved around its path the contacting portion of the disc with the rheostat coil, or with the contact plate to be presently described, will be shifted proportionately.

By forming the disc as an annular conical or upwardly convex member of iron or thin sheet steel, a number of advantages are obtained. The most simple form of construction is provided for and one which can be readily assembled in quantity production. The contact with the rheostat is held with strong magnetic force against the under side thereof and disengagement of the same through vibration when the device is applied to an automobile is prevented. There is no rubbing or sliding engagement but a rolling contact between the parts and thus no appreciable wear will occur. The conical shape of the disc insures a point contact of restricted area and readings of considerable accuracy may be obtained upon the dial of the indicating instrument through this feature.

The rheostat coil occupies somewhat more than one-half of the circumference of the cap member and at its end there is provided a contact plate 71 which serves as a contact member of a second circuit in which is placed the reserve supply indicating light or other indicating device.

The rheostat coil, as is clearly shown in Fig. 2, is in circuit with an electro-magnetic indicator 3 preferably secured to the instrument board of an automobile. As is clearly shown in Fig. 3, a single mounting 72 is provided upon which the reserve supply indicating light 7, the push button switch 4 and the indicator 3 are combined. The indicator is provided with a pointer 73 adapted to have its free end traverse a short arcuate path beneath which is a scale 74 having readings corresponding to the readings on the dial 18 in the cap heretofore described. In addition, the point at which the reserve supply indicating light will be illuminated may also be shown on the scale.

The reserve supply indicating light is preferably one which is almost flush with the mounting. The details of the construction of this feature are shown in Figs. 6, 7 and 8 of the drawing.

As is clearly shown in Fig. 7, the bulb 81 is housed within a sleeve 82 which has its forward edge sweated into the supporting frame 80. Said sleeve is screw-threaded at each end, the forward end receiving a flanged ring 83 within which the jewel lens 84 is seated, and the rearward end receiving the member 85 within which the spring contact terminals 86 for the bulb are mounted. The support for the terminals is provided with an extension flange which has slots 87 on opposite sides, within which the usual studs of a lamp, designed for engagement with a bayonet socket, are engaged. The lamp is held under pressure against the terminals by the inner plane surface of the jewel bearing against the bulb when the flanged ring is screwed down into position upon the forward end of the sleeve. The mounting 72 may be held in position by means of the flange upon said ring and a like flange 88 surrounding the push button at the opposite end of said mounting.

In the form shown in Fig. 8, the main parts of the lamp and housing are similar to those disclosed in Fig. 7, but the sleeve 91 is provided with an outwardly projecting flange 92 and is screw-threaded upon the outside of its body portion so that a clamping nut 93 and washer 94 may be used to secure said lamp to the instrument board 95 of an automobile, or other similar place of attachment.

Through the arrangement above described the apparatus is adaptable to tanks which use air pressure to feed the gas from the tank to the carburetor of the engine. Said apparatus will give an indication of the approaching depletion of the supply of liquid in the tank at any time when the ignition switch is closed. It will also give an indication on the indicator positioned on the instrument board of the approximate amount of liquid still remaining in the tank whenever the switch in the rheostat circuit is closed by pressing the push button.

The device uses no current during the period when the fuel supply is adequate and consumes only a small amount of current at the time the switch is closed from time to time and the reading on the indicator noted. There is thus no constant drain on the battery until the quantity of fuel in the tank is dropped to the point of approaching depletion. This indication, as well as the momentary readings on the dial on the instrument board, is only given when the ignition switch is closed and the automobile engine in operation. At such times the generator would be charging the battery and there would be no danger of exhausting the battery.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. An apparatus of the character described having in combination, a rotatably mounted magnet, means responsive to the change in level of a liquid for rotating said magnet, a resistance element mounted concentric with said magnet, and a loosely mounted tiltable armature also concentric with said magnet, said armature being tiltable by said magnet into contact with said resistance element.

2. An apparatus of the character described having in combination, a rotatably mounted magnet, means responsive to the change in level of a liquid for rotating said magnet, a resistance element mounted concentric with said magnet, and a loosely mounted tiltable conical armature also concentric with said magnet, said armature being tiltable by said magnet into contact with said resistance element.

3. An apparatus of the character described having in combination, a rotatably mounted magnet, means responsive to the change in level of a liquid for rotating said magnet, a resistance element mounted concentric with said magnet, a loosely mounted tiltable armature also concentric with said magnet, said armature being tiltable into contact with said resistance element by said magnet and contacting with the same at a point in radial alignment with the poles of said magnet to control said distant indicating means, and means enclosing said resistance element, armature and magnet.

4. An apparatus of the character described having in combination, a rotatably mounted magnet, means responsive to the change in level of a liquid for rotating said magnet, a circular resistance element mounted concentric with said magnet, a loosely mounted tiltable conical armature also concentric with said magnet, said armature being tiltable into contact with said resistance element by said magnet and contacting with the same at a point in radial alignment with the poles of said magnet to control said distant indicating means, and means enclosing said resistance element, armature and magnet.

5. An apparatus of the character described having in combination, a casing open at one side, a circular resistance element mounted in said casing, a circular armature loosely and tiltably mounted in said casing concentric with and slightly below said resistance element, a cover closing the open side of said casing and sealing said resistance element and armature therein, a magnet rotatably mounted above said casing concentric with said armature, and means responsive to the change in level of a liquid for rotating said magnet, said magnet tilting said armature upwardly into contact with said resistance element at a point in radial alignment with the poles of said magnet.

6. An apparatus of the character described having in combination, a casing open at one side, a circular resistance element mounted in said casing, a circular conical armature loosely and tiltably mounted in said casing concentric with and slightly below said resistance element, a cover closing the open side of said casing and sealing said resistance element and armature therein, a magnet rotatably mounted above said casing concentric with said armature, and means responsive to the change in level of a liquid for rotating said magnet, said magnet tilting said armature upwardly into contact with said resistance element at a point in radial alignment with the poles of said magnet.

7. An apparatus of the character described having in combination, a rotatably mounted magnet, means responsive to the change in level of a liquid for rotating said magnet, a resistance element mounted concentric with said magnet, a loosely mounted tiltable armature also concentric with said magnet, a resistance element cover plate of non-magnetic material between said magnet and said resistance element, and a plurality of buttons of magnetic material inserted in said cover plate, said buttons having slight clearance from said magnet on one side and from said armature on the other side, to provide for the maximum magnetic attraction for said armature to hold the same in rolling contact with the underside of said resistance element.

8. An apparatus of the character described having in combination, a rotatably mounted magnet, means responsive to the change in level of a liquid for rotating said magnet, a resistance element mounted concentric with said magnet, a loosely mounted tiltable conical armature also mounted concentric with said magnet and in direct magnetic contact with one pole thereof, a resistance element cover plate of non-magnetic material between said magnet and said resistance element, and a plurality of buttons of magnetic material inserted in said cover plate, said buttons having slight clearance from said magnet on one side and from said armature on the other side, to provide for the maximum magnetic attraction for said armature to hold the same in rolling contact with the underside of said resistance element.

9. An apparatus of the character described, having in combination a freely supported light metal disc, a resistance element mounted adjacent thereto and magnetic means for moving said disc in rolling contact with said resistance element.

Signed by us, this 13th day of June 1923.

WILLIAM B. CHURCHER.
GEORGE S. SALZMAN.